(12) United States Patent
Suparman

(10) Patent No.: US 8,618,472 B2
(45) Date of Patent: Dec. 31, 2013

(54) DOWNHOLE CARBON LOGGING APPARATUS, SYSTEMS, AND METHODS

(75) Inventor: Fnu Suparman, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/263,305

(22) PCT Filed: Apr. 7, 2010

(86) PCT No.: PCT/US2010/030260
§ 371 (c)(1),
(2), (4) Date: Dec. 21, 2011

(87) PCT Pub. No.: WO2010/118147
PCT Pub. Date: Oct. 14, 2010

(65) Prior Publication Data
US 2012/0091328 A1      Apr. 19, 2012

Related U.S. Application Data

(60) Provisional application No. 61/167,374, filed on Apr. 7, 2009.

(51) Int. Cl.
*G01V 5/08* (2006.01)
*G01V 5/00* (2006.01)
*G01D 18/00* (2006.01)

(52) U.S. Cl.
USPC ............... 250/269.1; 250/253; 250/252.1

(58) Field of Classification Search
USPC ......... 250/253, 269.1, 268, 269.2, 256, 252.1
See application file for complete search history.

(56) References Cited

U.S. PATENT DOCUMENTS

| 4,071,755 A * | 1/1978 | Supernaw et al. ............ 250/253 |
| 4,475,038 A | 10/1984 | Lochmann et al. |
| 5,440,118 A | 8/1995 | Roscoe |
| 2008/0179509 A1 | 7/2008 | Jacobi et al. |

FOREIGN PATENT DOCUMENTS

WO    WO-2010118147 A1    10/2010

OTHER PUBLICATIONS

"International Application Serial No. PCT/US2010/0030260, Search Report mailed Jun. 4, 2010", 4 pgs.
"International Application Serial No. PCT/US2010/030260, Written Opinion mailed Jun. 4, 2010", 7 pgs.
"International Application Serial No. PCT/US2010/030260, International Preliminary Report on Patentability mailed Jun. 12, 2012", 14 pgs.

(Continued)

*Primary Examiner* — David Porta
*Assistant Examiner* — Faye Boosalis
(74) *Attorney, Agent, or Firm* — Schwegman, Lundberg & Woessner, P.A.; Benjamin Fite

(57) ABSTRACT

In some embodiments, apparatus, systems, and methods may operate to emit radiation into an earth formation from a source positioned below a surface of the earth, collect resulting radiation that is a result of the radiation emitted and interacting with the formation, and to determine the total carbon yield from the resulting radiation. Further activities may include determining the amount of inorganic carbon content from carbonate minerals in the formation based on a carbon-calcium ratio derived from the resulting radiation, as well as from iron-carbon based minerals in the formation based on a carbon-iron ratio derived from the resulting radiation. Additional apparatus, systems, and methods are disclosed.

22 Claims, 8 Drawing Sheets

(56) References Cited

OTHER PUBLICATIONS

Charles, M. J, et al., "Methods for the determination of carbon in soils and sediments. A review", *Analyst, 111*, (1986), 385-390.

Jacobson, L. A, et al., "Elemental Yields and Complex Lithology Analysis From the Pulsed Spectral Gamma Log", *The Log Analyst, 37*(1), (Jan.-Feb. 1996), 50-71.

Jacobson, L. A, et al., "Response Characterization of an Induced Gamma Spectrometry Tool Using a Bismuth Germanate Scintillator". *The Log Analyst, 34*(34), (Jul.-Aug. 1993), 14-23.

Salaville, A., et al., "Carbon Analysis: Organic and Inorganic Carbon in Soils", Application Note 23, Jobin Yvon Horiba Group, (published prior to Dec. 21, 2011), 4 pgs.

Schumacher, B. A., "Methods for the Determination of Total Organic Carbon (TOC) in Soils and Sediments", National Exposure Research Laboratory, NCEA-C-1282, EMASC-001, (Apr. 2002), 25 pgs.

Truax, J. A, et al., "Field experience and results obtained with an improved carbon/oxygen logging system for reservoir optimization", *SPWLA 42, Annual Logging Symposium, Society of Petrophysicists & Well Log Analysts*, (2001), 1-14.

Wyatt, D. F, et al., "Elemental yields and complex lithology analysis from the pulsed spectral gamma log", *SPWLA 34 Annual Logging Symposium, Society of Petrophysicists & Well Log Analysts*. (1993), 1-25.

\* cited by examiner

DOWNHOLE CARBON LOGGING APPARATUS, SYSTEMS, AND METHODS

RELATED APPLICATION

This patent application is a nationalization under 35 U.S.C. 371 of PCT/US2010/030260, filed Apr. 7, 2010, and published as WO 2010/118147 A1 on Oct. 14, 2010; which claimed priority under 35 U.S.C. 119(e) to U.S. Provisional Patent Application Ser. No. 61/167,374, filed Apr. 7, 2009, which applications and publication are incorporated herein by reference in their entirety.

BACKGROUND

When locating and extracting hydrocarbons, well logging is commonly used to evaluate underground formations for the presence and producibility of hydrocarbon reservoirs. During the well-drilling process, or shortly thereafter, instruments are passed through the well bore to collect information about the formations through which the well bore passes. The information is traditionally collected in "log" form, i.e., a table or chart of measured data values as a function of instrument position.

BRIEF DESCRIPTION OF THE DRAWINGS

Embodiments of the invention may be understood by referring to the following description and accompanying drawings which illustrate examples of such embodiments. In the drawings.

DETAILED DESCRIPTION

Figure 1:
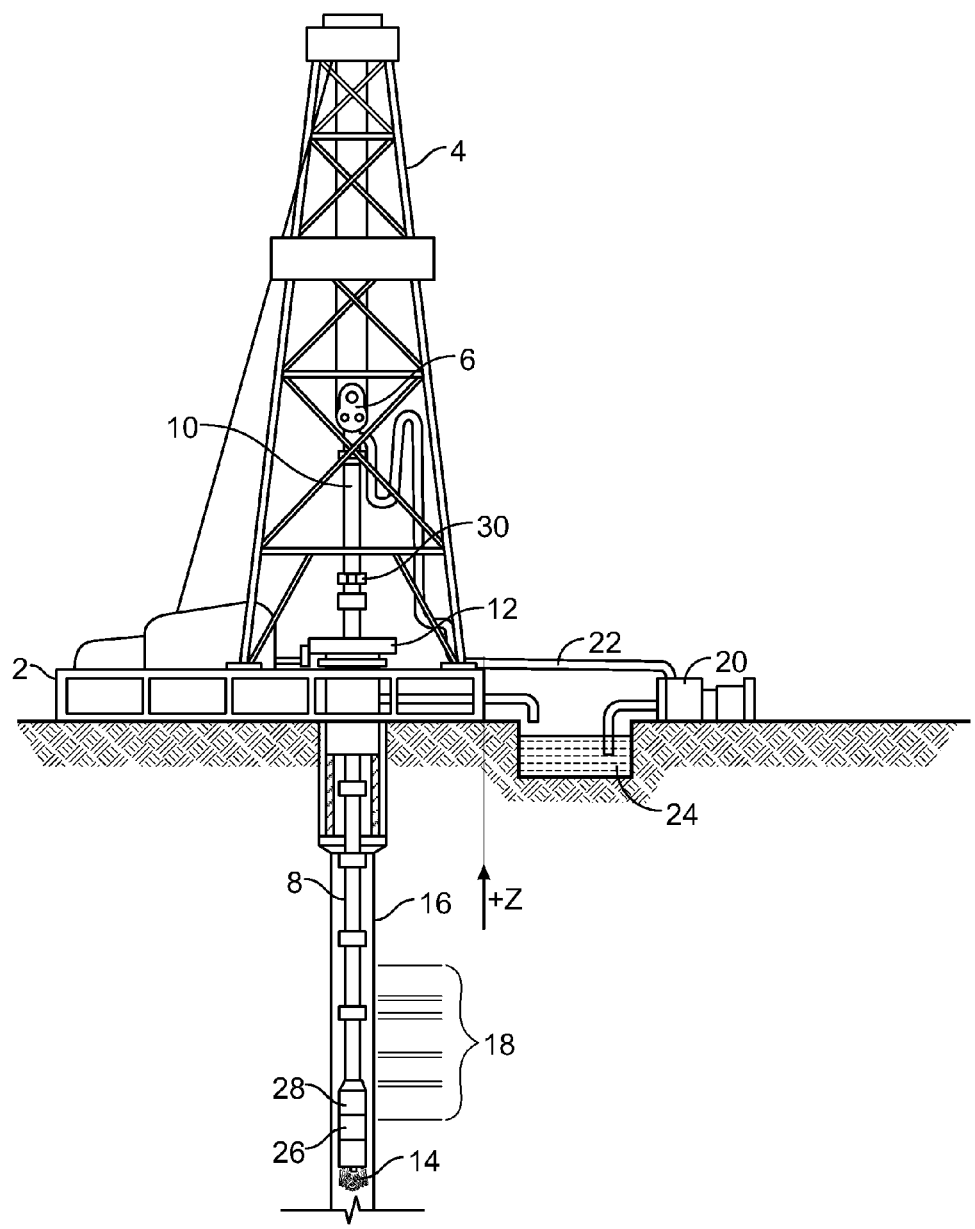
FIG. 1 shows an illustrative environment for drilling a well, according to some example embodiments.

Methods, apparatus and systems that can be used to determine organic carbon content of a reservoir are described. In the following description, numerous specific details are set forth. However, it is understood that embodiments of the invention may be practiced without these specific details. In other instances, well-known circuits, structures and techniques have not been shown in detail in order not to obscure the understanding of this description. Some embodiments may be used after or during the drilling operation (e.g., wireline operations, Measurement While Drilling (MWD), Logging While Drilling (LWD), etc.).

In some embodiments, a tool is positioned downhole to irradiate formations of the earth. The irradiation causes neutron and nucleus interaction with the earth formation. The resulting radiation that is caused by the irradiation of the formations can be received and processed. In some example embodiments, the resulting radiation is gamma rays.

The tool can use two different methods to collect the resulting radiation: radiation sorted by energy and radiation sorted by time lapse. The radiation sorted by energy provides elemental yields. The radiation sorted by time lapse provides a capture cross section.

Some embodiments determine organic carbon content from the radiation sorted by energy by correcting total carbon measured using the inorganic carbon portion. In particular, the inorganic carbon portion is determined and then subtracted from the total carbon to provide the organic carbon content. The inorganic carbon from the earth formation generally results from a carbonate material. Another source of inorganic carbon can be from cement in the borehole if logging occurs in a cased hole environment. In the earth formation, carbonate material can include calcite (e.g., limestone ($CaCO_3$), dolomite ($CaMg(CO_3)_2$), and iron elements (e.g., siderite and ankerite).

In some embodiments, the inorganic carbon correction is divided into two different groups. A first group involves calcite and is a function of the carbon-calcium yield ratio. A second group involves iron elements and is a function of the carbon-iron yield ratio. After correction to remove the inorganic carbon portion, the organic carbon content can be used to identify kerogen content and can be calibrated to vitrinite reflectance from core data. Moreover, further analysis of organic carbon can determine the type of kerogen.

Interpretation of the data from the radiation sorted by energy can be used to determine a carbon-oxygen ratio and a lithology ratio (calcium yield/silicon yield) to determine hydrocarbon saturation. This determination is dependent on porosity prior to computation. There is an assumption that hydrocarbon fills the pores in the rock. For shale, the kerogen can be assumed to be a mineral (part of the solid) and free gas in the pore. The sigma interpretation can use material balance in the sigma equation. The sigma measurement is a volumetric measurement equal to the sum of all sigma components.

$$\Sigma_{meas} = \sum_{1}^{n} V_i \Sigma_i$$

For shale in rock, the sigma component is contributed by the rock mineralogy, kerogen, gas and water. The difficulty is identifying the gas portion since porosity is small and sigma gas is low. Thus, the product volume and sigma become smaller.

As described above, the carbon yield output from the resulting radiation measurement constitutes total carbon, which is the sum of inorganic carbon and organic carbon content. Some embodiments operate to determine the portion of inorganic carbon. Generally there are two main source compounds in the rock that contribute to the inorganic carbon content. The first includes a mineral that comprises calcite, which could be in limestone (CaCO3) or dolomite (CaMg(CO3)2). Both minerals have carbon and are attached to a calcium compound. The second includes a mineral that comprises siderite (FeCO3), for which the carbon element is attached to an iron compound. In the cased hole environment, a small amount of inorganic carbon could be contributed by steel (e.g., due to well completion).

Therefore, as a first correction, the carbon-calcium ratio can be used to determine the portion of inorganic carbon that is from calcite. In particular, the carbon-calcium ratio is approximately constant in limestone and dolomite molecules (but slightly different because dolomite includes magnesium). As a second correction, the iron yield from the earth formation (and possibly from the casing of the borehole) is used. In some embodiments, iron yield from the casing can be estimated by cross plot iron yield with casing thickness in known zones that have no iron mineral. This relationship can be used to make corrections for iron yield contributed from the earth formation. In some example embodiments, the iron content from the earth formation is assumed to result from at least one of siderite and ankerite. Some embodiments can be used as described herein in shale plays and coal bed methane.

Figure 2:
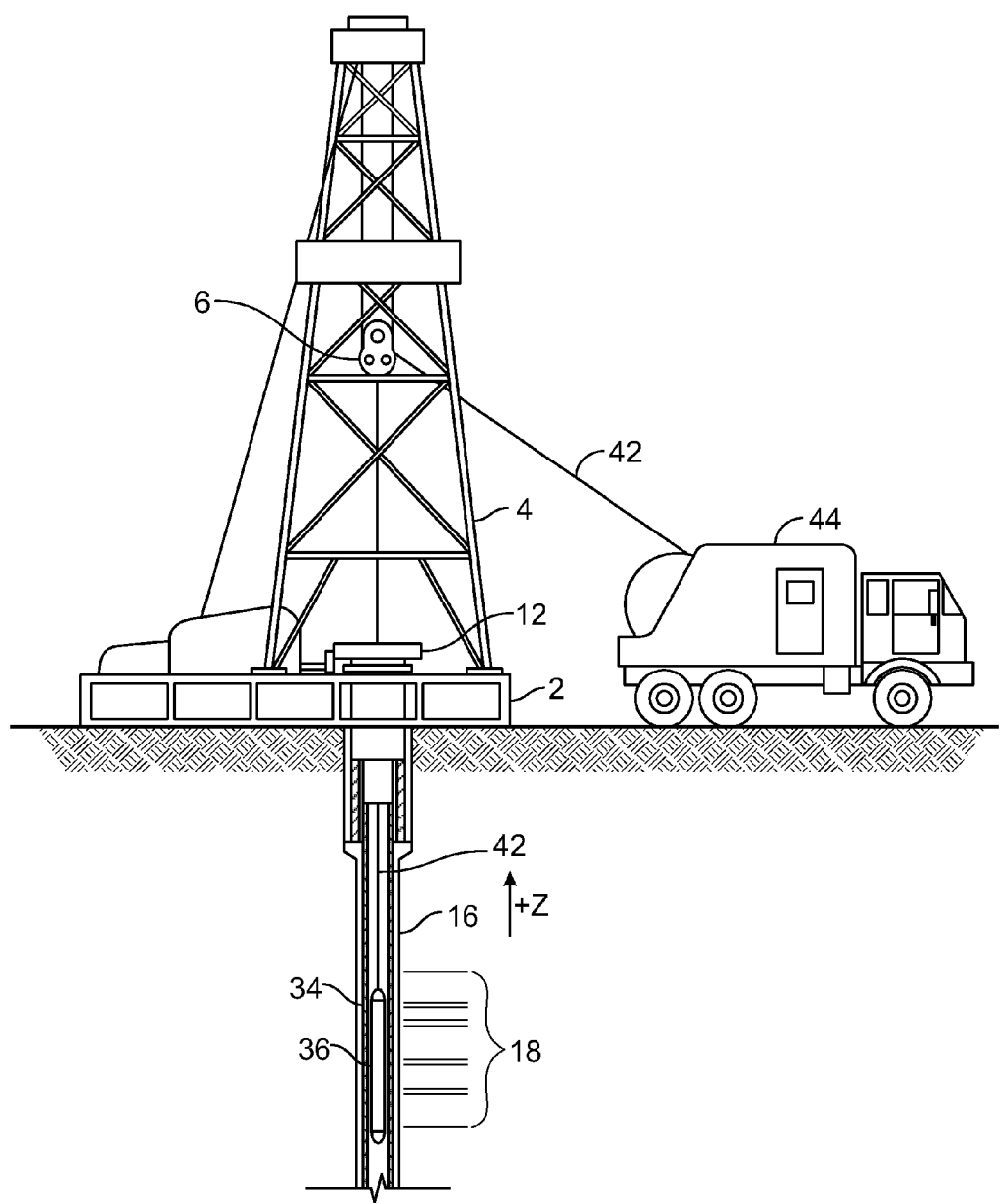
FIG. 2 illustrates a wireline operation, according to some example embodiments.

FIGS. 1-2 illustrate two different environments wherein some embodiments can be used. FIG. 1 shows an illustrative environment for drilling a well, according to some example embodiments. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a well bore 16 that passes through various formations 18. A pump 20 circulates drilling fluid through a feed pipe 22 to the kelly 10, downhole through the interior of the drill string 8, through orifices in the drill bit 14, back to the surface via the annulus around the drill string 8, and into a retention pit 24. The drilling fluid transports cuttings from the well bore 16 into the pit 24.

One or more LWD instruments can be integrated into a logging tool 26 located near the bit 14. As the bit 14 extends the well bore 16 through the formations 18, the logging tool 26 collects measurements relating to various formation properties as well as the bit position and various other drilling conditions. The logging tool 26 may take the form of a drill collar, i.e., a thick-walled tubular element that provides weight and rigidity to aid the drilling process. A telemetry sub 28 may be included to transfer tool 26 measurements to a surface receiver 30 and to receive commands from the surface receiver.

In some embodiments, the logging tool 26 comprises a radiation source and a radiation collector, in accordance with various embodiments (as further described below). Optionally, the logging tool 26 comprises a processor, machine-readable media, etc. to perform all or some of the operations described herein that can be used to determine the organic carbon content.

Once a well has been drilled, another environment is established wherein some example embodiments can be used. In particular, FIG. 2 illustrates a wireline operation, according to some example embodiments. The well bore 16 can be lined with casing 34 as shown in FIG. 2 to preserve the integrity of the hole and to prevent fluid loss into porous formations along the borehole path. Typically, the casing 34 is permanently cemented into place to maximize the borehole's longevity and to prevent unwanted fluid communication between formations. Subsequent logging operations may be conducted using a wireline logging tool 36, such as a sensing instrument sonde suspended by a cable 42 having conductors for transporting power to the tool 36 and telemetry from the tool 36 to the surface. A logging facility 44 collects measurements from the logging tool 36, and typically includes computing facilities for processing and storing the measurements gathered by the logging tool 36.

The wireline logging tool 36 can include one or more logging tools such as a pulsed neutron capture (PNC) tool. PNC tools operate by accelerating deuterium ions toward a target that includes tritium and possibly deuterium. At sufficiently high energies, the nuclei fuse, producing a helium atom that promptly ejects a high-energy neutron. These high energy neutrons travel into the surrounding formation where they impact formation nuclei. Often the neutrons are captured, causing "capture" gamma rays to be emitted. Alternatively, the high energy neutrons scatter from the nuclei inelastically, causing "inelastic" gamma rays to be emitted. In any event, the energy spectrum and/or decay rate of the emitted gamma rays can be measured and analyzed to identify carbon yields, calcium yields, iron yields, etc.

Figure 3:
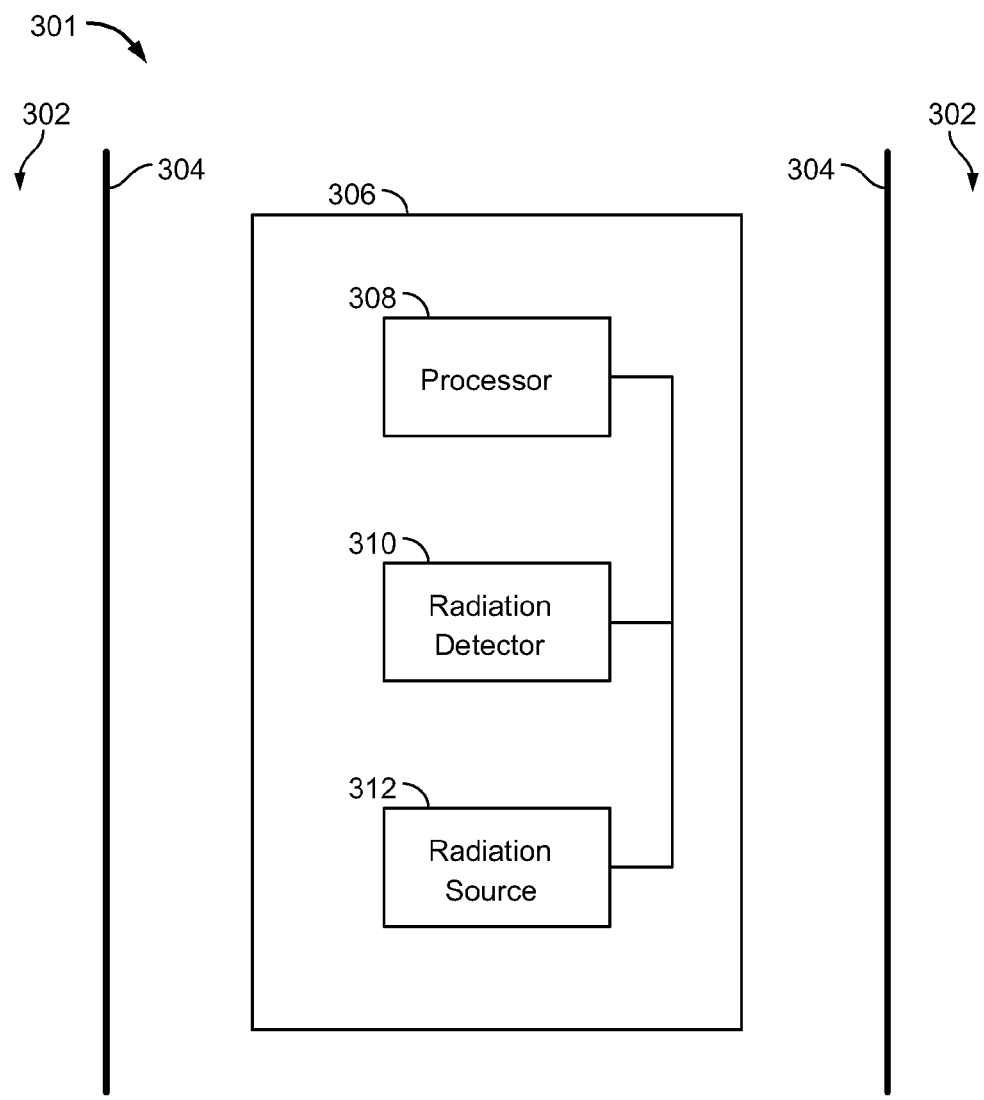
FIG. 3 illustrates a logging tool for determining organic carbon content, according to some example embodiments.

FIG. 3 illustrates a logging tool 306 for determining organic carbon content, according to some example embodiments. A logging tool 306 can be part of a drilling string wherein the logging occurs during the drilling of the borehole (see the description of FIG. 1 above). For example, the logging tool 306 can be part of bottom hole assembly in a drill string. Alternatively, the logging tool 306 can be part of a wireline operation. For example, the logging tool 306 can be part of a wireline logging tool (see the description of FIG. 2 above).

As shown, the logging tool 306 is positioned below the surface of the earth in a borehole 301, wherein earth formations 302 are on either side. In some example embodiments, walls 304 of the borehole 301 include a casing (e.g., a cement casing), which may or may not include iron content. The logging tool 306 includes a radiation source 312, a radiation detector 310 and a processor 308, which can be communicatively coupled together. The radiation source 312 irradiates the earth formations 302. The radiation detector 310 collects radiation (e.g., gamma ray spectra) that is a result of the irradiation by the radiation source 312. In some example embodiments, the processor 308 processes data from the detector 310 representing the collected radiation (as further described below). Alternatively or in addition, this data is transmitted to the surface for processing. As further described below, the collected radiation data is used to determine the organic carbon content.

Figure 4:
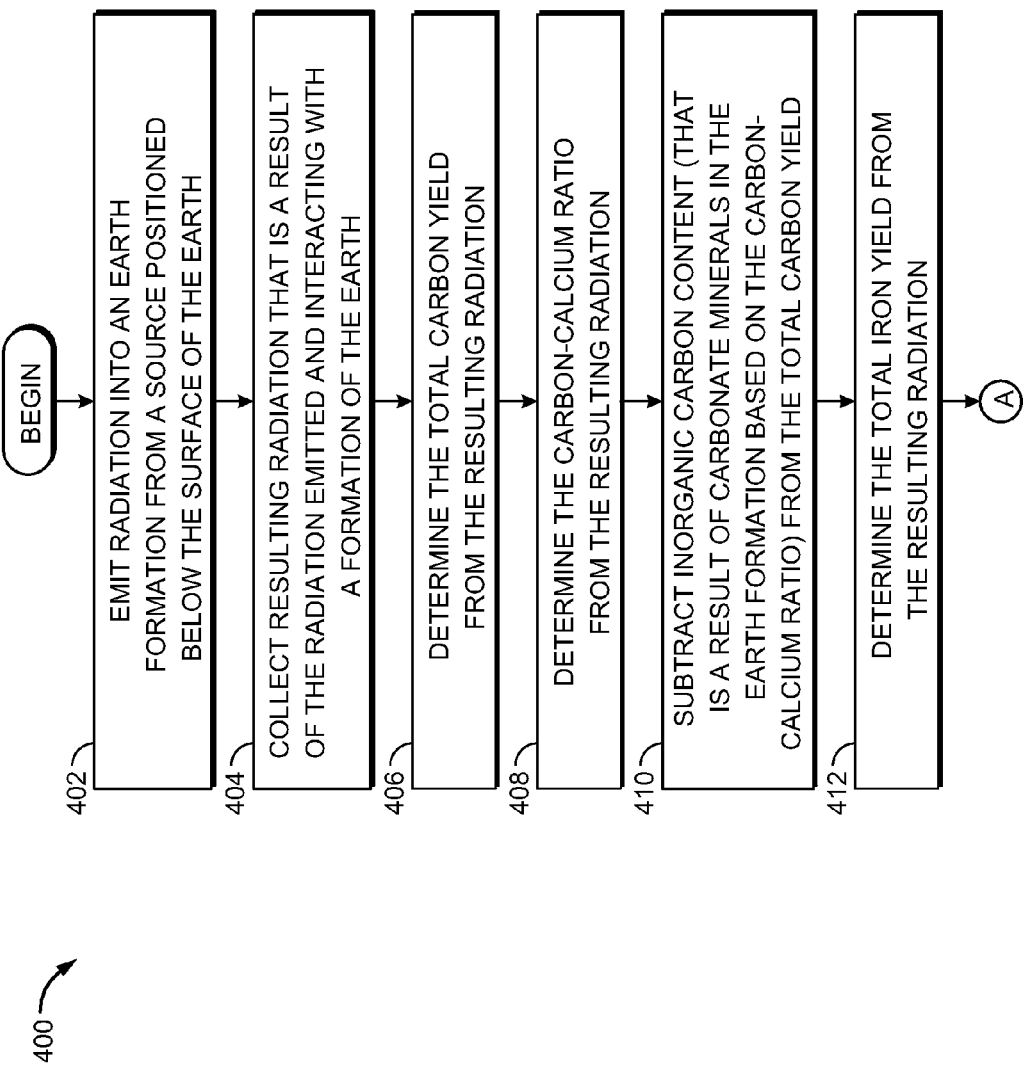
FIG. 4 is a diagram of a method for determining organic carbon content, according to some example embodiments.
Figure 4:
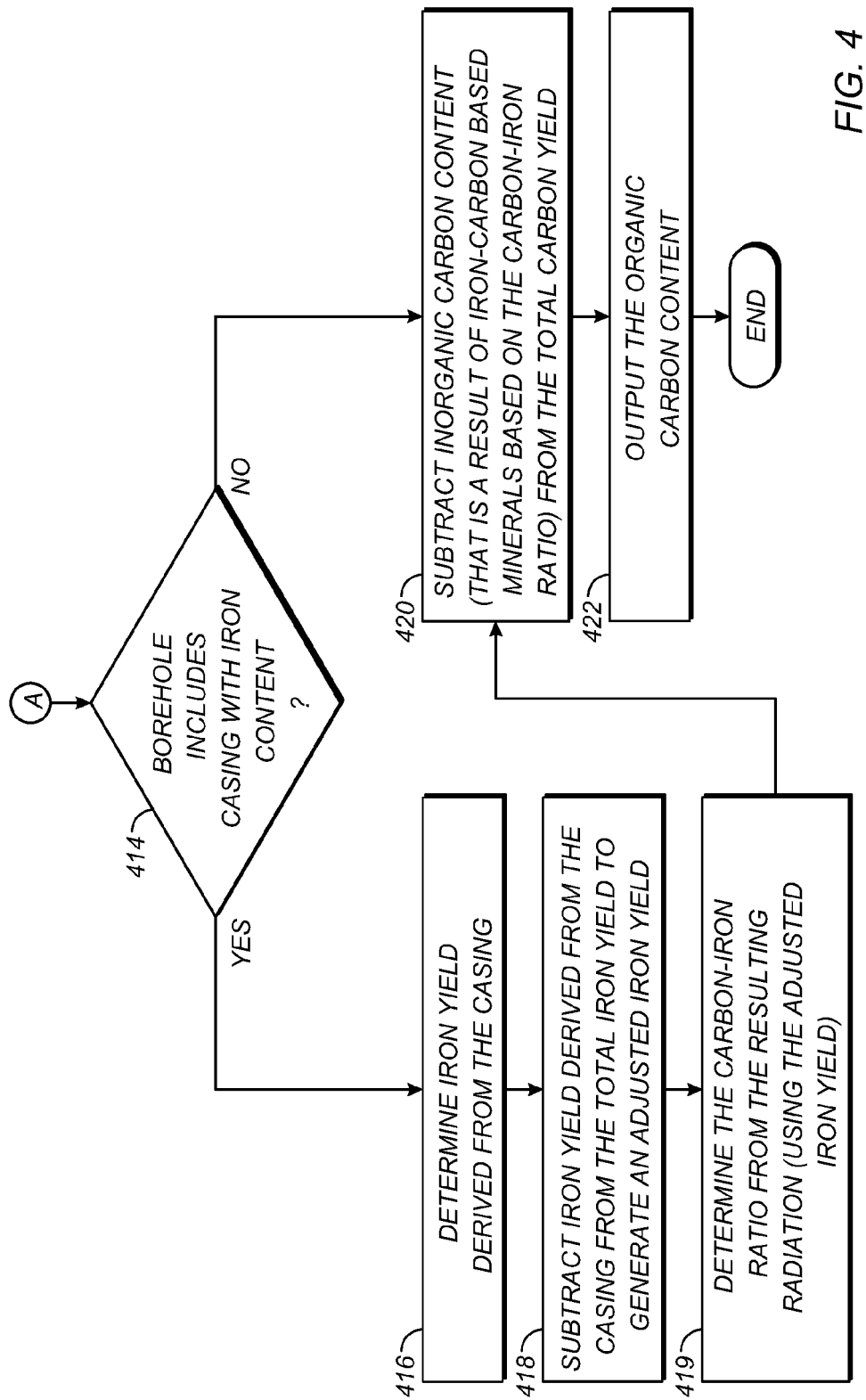

The operations for determining organic carbon content are now described. In particular, FIG. 4 is a diagram of a method for determining organic carbon content, according to some example embodiments. In some embodiments, some or all of the operations in a method 400 are performed downhole (e.g., downhole within a logging tool). Alternatively or in addition, some of the operations are performed by components above the surface of the earth. Some of the operations are described as being performed by a processor. Such operations can be performed by software or firmware executing thereon. Alternatively or in addition, such operations can be performed by other types of hardware.

The method 400 will now be described by referring to FIGS. 3 and 4. The method 400 commences, and goes on to block 402. At block 402, the radiation source 312 emits radiation into an earth formation from a source positioned below the surface of the earth. In some embodiments, the radiation source 312 comprises a pulsed neutron source. In some embodiments, the radiation source 312 comprises an accelerator neutron source. In some embodiments, a high energy neutron (~114 MeV) is produced by nucleus reaction between deuterium (H2) and tritium (H3) in the accelerator tube of the source 312. The method 400 continues at block 404.

At block 404, the radiation detector 310 collects radiation that is a result of the radiation emitted and interacting with a formation of the earth. In some example embodiments, the collected radiation comprises scattering gamma ray spectra resulting from neutron and nucleus interaction in the rock of the earth formation. The radiation detector 310 can be any combination of long-spaced and short-spaced detectors. In some example embodiments, the radiation detector 310 comprises a gamma ray detector that uses a bismuth germinate (BGO) crystal to collect the back-scattering radiation from the rock. The nucleus reaction between high energy neutrons and atomic nuclei radiate gamma rays with specific energies for each element in the rock. The gamma rays are collected and sorted by time and energy. The gamma rays sorted by time or decay measurement are converted to sigma logs (capture cross section), and gamma rays sorted by energy (gamma ray spectrum) are converted to element yield measurements. The method 400 continues at block 406.

At block 406, the processor 308 determines the total carbon yield from the resulting radiation. In particular, the radiation impinging on the radiation detector 310 comprises different properties, thereby enabling the processor 308 to differentiate between elements that emit the radiation (e.g., carbon, oxygen, magnesium, silicon, calcium, iron, etc.). In particular, the output of the stripping method from the gamma ray spectrum is the yield for each element in the model. The carbon contribution from calcite mineral (limestone or dolomite) is a function of volumetric content of calcite mineral and carbon content in zero porosity calcite. The high reference point for carbon contributed from calcite can be determined from measurements in the zero porosity calcite. By cross-plotting between total carbon yield and carbon-to-calcium yield ratio, the inorganic carbon correction due to carbon contribute from calcite mineral can be determined. Accordingly, the processor 308 determines the total carbon yield based on the properties of the received radiation. The method continues at block 408.

At block 408, the processor 308 determines the carbon-calcium ratio from the resulting radiation. In particular, similar to the total carbon yield, the radiation detector 310 determines the total calcium yield. Calcite from the earth formation (a carbonate mineral that includes a combination of calcium and carbon) comprises either limestone (($CaCO_3$) and/or dolomite ($CaMg(CO_3)_2$). Therefore, the amount of carbon and calcium coming from calcite is approximately constant. The processor 308 derives the amount of carbon coming from the calcite based on the carbon-calcium ratio.

Figure 5:
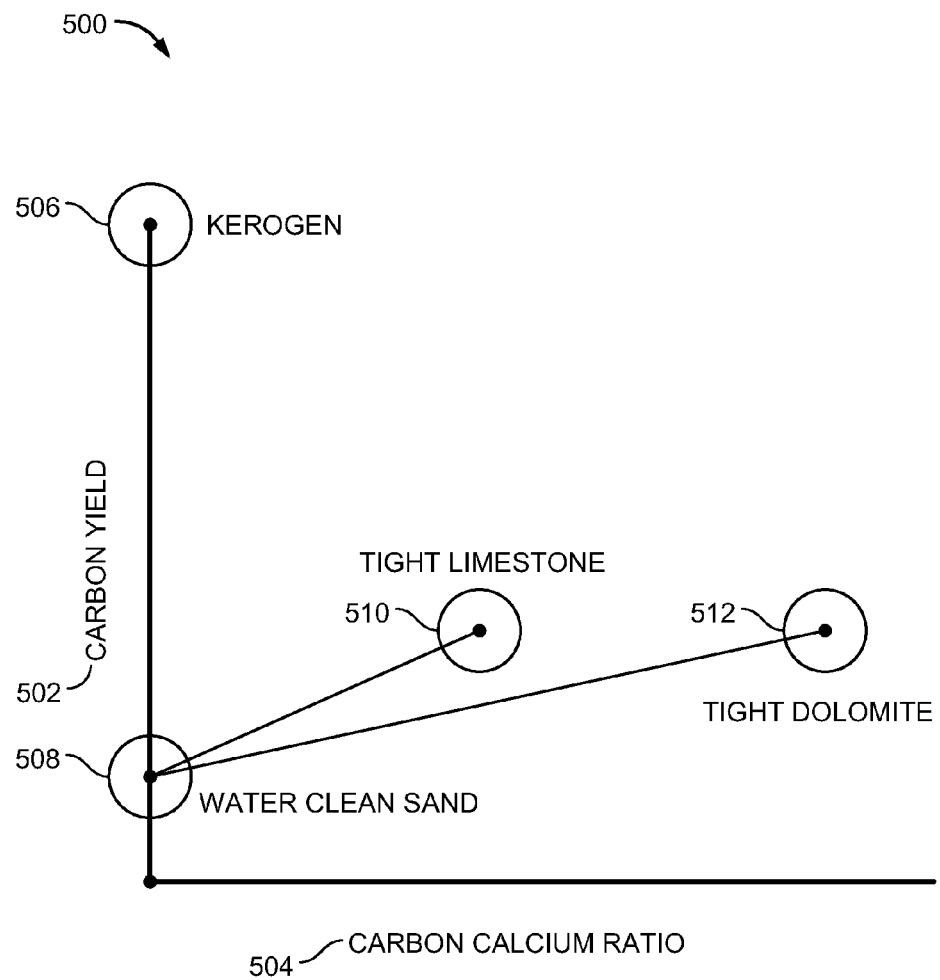
FIG. 5 is a graph of a cross plot model for carbon yield versus carbon-calcium ratio, according to some example embodiments.

To further illustrate, FIG. 5 is a graph of a cross plot model for carbon yield versus carbon-calcium ratio, according to some example embodiments. A graph 500 includes the carbon yield and the carbon-calcium ratio as the y-axis 502 and the x-axis 504, respectively. As shown, if the carbon yield is high and the carbon-calcium ratio is essentially zero, the earth formation comprises kerogen (point 506). If the carbon yield is low and the carbon-calcium ratio is essentially zero, the earth formation comprises water clean sand (point 508). Points 510 and 512 show the approximate carbon yield and carbon-calcium ratio for limestone and dolomite, respectively.

Figure 6:
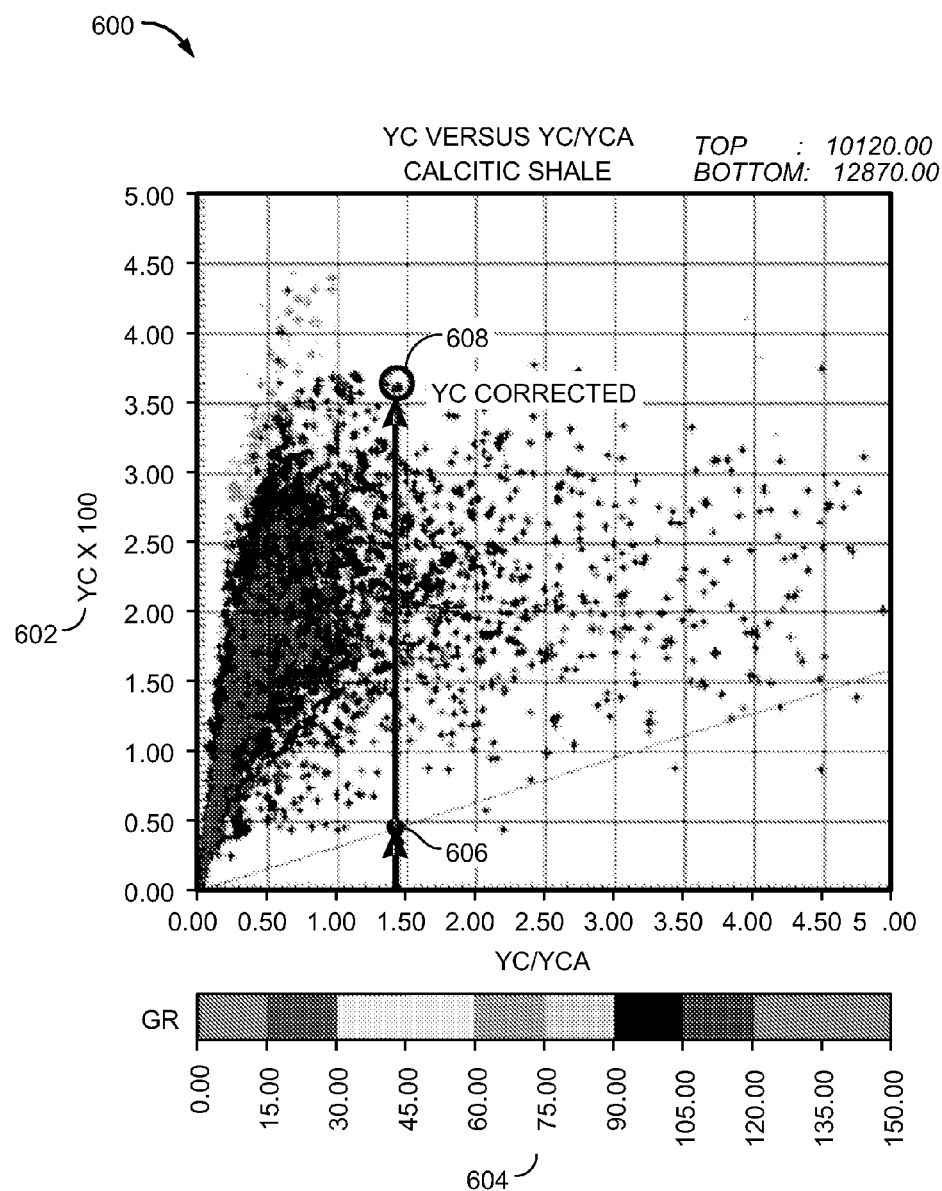
FIG. 6 is a graph of a correction method for carbon-calcite in calcitic shale, according to some example embodiments.

FIG. 6 is a graph of a correction method for carbon-calcite in calcitic shale, according to some example embodiments. A graph 600 includes the carbon yield and the carbon-calcium ratio as the y-axis 602 and the x-axis 604, respectively, for calcitic shale. The graph 600 shows a carbon yield correction that results in moving the carbon yield from point 606 to point 608. Returning to FIGS. 3 and 4, the description of the method 400 continues at block 410.

At block 410, the processor 308 subtracts the inorganic carbon content (that is a result of carbonate minerals in the earth formation based on the carbon-calcium ratio) from the total carbon yield. In particular, the processor 308 determines the amount of carbon to be subtracted based on the carbon-calcium ratio (which is representative of the carbonate mineral content). Such carbon is a part of the inorganic carbon content within the total carbon yield. The method 400 continues at block 412.

At block 412, the processor 308 determines the total iron yield from the resulting radiation. As described above, the resulting radiation impinging on the radiation detector 310 comprises different properties, thereby enabling the processor 308 to differentiate between elements that emit the radiation. Accordingly, the processor 308 determines the total iron yield based on the properties of the received radiation. In particular, the radiation impinging on the radiation detector 310 comprises different properties, thereby enabling the processor 308 to differentiate between various elements (e.g., carbon, oxygen, magnesium, silicon, calcium, iron, etc.). In particular, the output of the stripping method from the gamma ray spectrum is the yield for each element in the model. The method continues at block 414.

At block 414, the processor 308 determines whether the borehole includes casing with iron content. The processor 308 can be configured based on its environment. For example, the software executing on the processor 308 can be configured such that the borehole does not include such casing if the environment is a drilling operation.

A wireline operation may or may not include casing. A parameter can be set such that the borehole does or does not include such casing in a wireline operation. This parameter can be sent downhole or preconfigured prior to the logging tool being sent downhole.

In some embodiments, some parts of the casing can include iron content, while other parts of the casing do not. Therefore, the casing does or does not include iron content depending on the location in the borehole. Thus, the processor 308 could set this value depending on the position of the logging tool in the borehole. If the borehole includes casing with iron content, the method continues at block 416. Otherwise, the method continues at block 420.

At block 416, the processor 308 determines the iron yield derived from the casing. In some example embodiments, iron yield coming from the casing can be estimated by cross plot yield, along with casing thickness in known zones that have no iron material. Therefore, the method at block 416 can receive this iron yield from the surface or be preconfigured with such value (depending on the location of the logging tool in the borehole). The method continues at block 418.

At block 418, the processor 308 subtracts the iron yield derived from the casing from the total iron yield to generate an adjusted iron yield. Accordingly, the adjusted iron yield is considered iron yield from the earth formation. The method continues at block 419.

At block 419, the processor 308 determines the carbon-iron ratio from the resulting radiation (using the adjusted iron yield). Carbon-iron minerals from the formation of the earth can comprise one or more of siderite ($FeCO_3$) and ankerite ($CaFe(CO_3)_2$). The carbon contributed from carbon-iron minerals (e.g., siderite and ankerite) is a function of volumetric content of carbon-iron minerals and carbon content in zero porosity calcite. The high reference point for carbon contributed from calcite can be determined from measurements in the zero porosity carbon-iron mineral. By cross plotting between total carbon yield and carbon to iron yield ratio, the inorganic carbon correction due to the carbon contribution from carbon-iron minerals can be determined. Accordingly, the processor 308 determines the carbon-iron ratio (similar to determining the carbon-calcium ratio as described above). The method continues at block 420.

At block 420, the processor 308 subtracts inorganic carbon content (that is a result of iron-carbon based minerals based on the carbon-iron ratio) from the remaining iron yield. In particular, the processor 308 determines the amount of inorganic carbon (associated with carbon-iron minerals) based on the carbon-iron ratio. Such carbon is part of the inorganic carbon content within the total carbon yield. Accordingly, after removing the inorganic carbon content associated with calcium (see description above) and the inorganic carbon content associated with iron, the remaining carbon yield comprises the organic carbon content. The method continues at block 422.

At block 422, the processor 308 provides as output the organic carbon content. The organic carbon content can be used to identify kerogen content and can be calibrated to vitrinite reflectance from core data. Moreover, further analysis of organic carbon can determine the type of kerogen.

Figure 7:
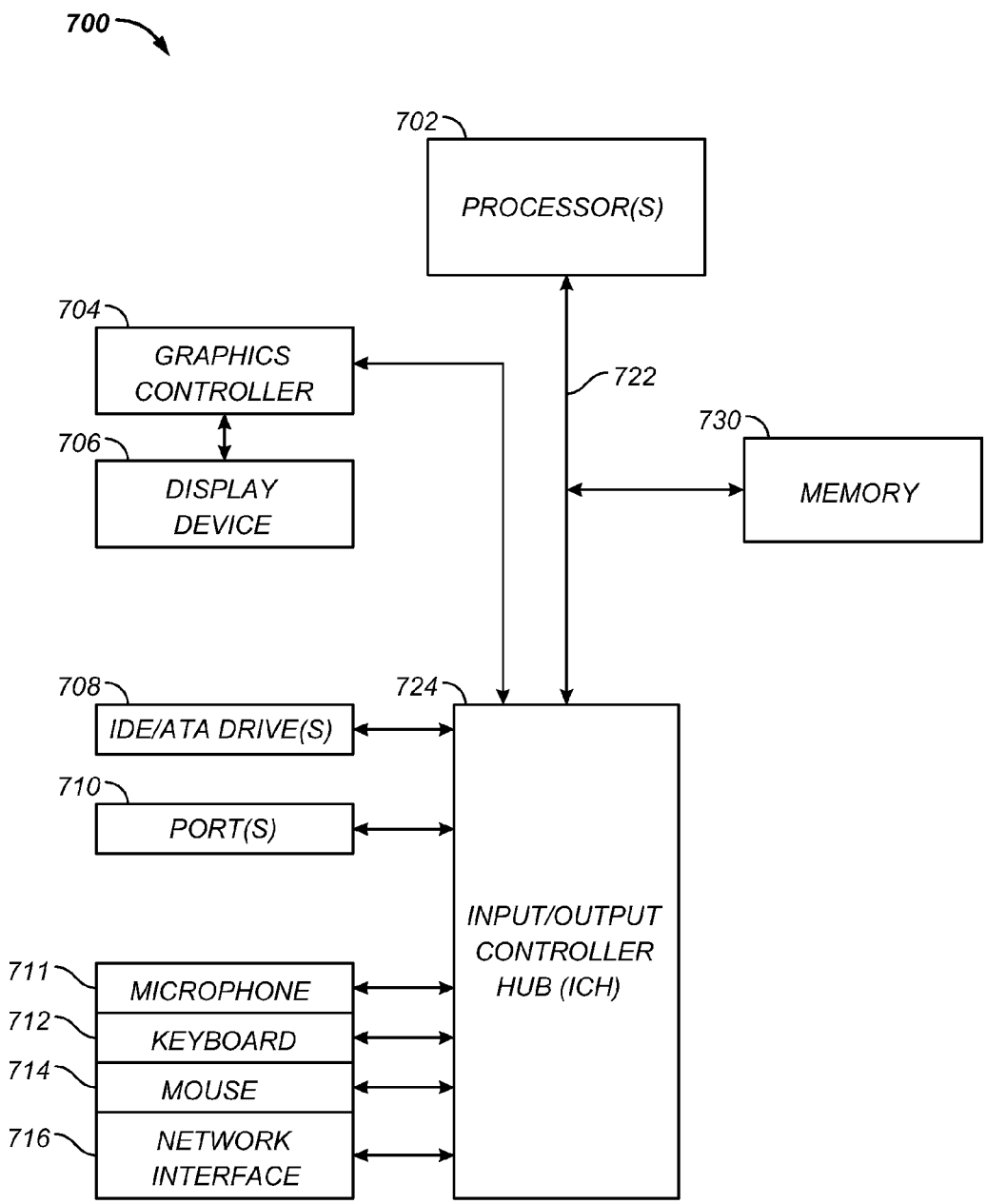
FIG. 7 illustrates a computer that may be used for determining organic carbon content, according to some example embodiments.

A detailed block diagram of an example computer environment, according to some embodiments, is now described. In particular, FIG. 7 illustrates a computer that may be used for determining organic carbon content, according to some example embodiments. A computer system 700 may be representative of some or all of the components used either downhole or at the surface of the earth to determine organic carbon content. For example, some of the components of the computer system 700 are incorporated into a logging tool downhole (as described above).

As illustrated in FIG. 7, the computer system 700 comprises processor(s) 702. The computer system 700 also includes a memory unit 730, processor bus 722, and Input/Output controller hub (ICH) 724. The processor(s) 702, memory unit 730, and ICH 724 are coupled to the processor bus 722. The processor(s) 702 may comprise any suitable processor architecture. The computer system 700 may comprise one, two, three, or more processors, any of which may execute a set of instructions to implement the various method embodiments of the invention.

The memory unit 730 may store data and/or instructions, and may comprise any suitable memory, such as a dynamic random access memory (DRAM). The computer system 700 also includes IDE drive(s) 708 and/or other suitable storage devices. A graphics controller 704 controls the display of information on a display device 706, according to some embodiments of the invention.

The input/output controller hub (ICH) 724 provides an interface to I/O devices or peripheral components for the computer system 700. The ICH 724 may comprise any suitable interface controller to provide for any suitable communication link to the processor(s) 702, memory unit 730 and/or to any suitable device or component in communication with the ICH 724. For one embodiment of the invention, the ICH 724 provides suitable arbitration and buffering for each interface.

For some embodiments of the invention, the ICH 724 provides an interface to one or more suitable integrated drive electronics (IDE) drives 708, such as a hard disk drive (HDD) or compact disc read only memory (CD ROM) drive, or to suitable universal serial bus (USB) devices through one or more USB ports 710. For one embodiment, the ICH 724 also provides an interface to a microphone 711, a keyboard 712, and a mouse 714. For one embodiment of the invention, the ICH 724 also provides a network interface 720 though which the computer system 700 can communicate with other computers and/or devices.

In some embodiments, the computer system 700 includes a machine-readable medium that stores a set of instructions (e.g., software) embodying any one, or all, of the methodologies for described herein. Furthermore, software may reside, completely or at least partially, within memory unit 730 and/or within the processor(s) 702.

In this description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one of ordinary skill in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one of ordinary skill in the art to affect such feature, structure, or characteristic in connection with other embodiments whether or not explicitly described.

In view of the wide variety of permutations to the embodiments described herein, this detailed description is intended to be illustrative only, and should not be taken as limiting the scope of the invention. What is claimed as the invention, therefore, is all such modifications as may come within the scope of the following claims and equivalents thereto. Therefore, the specification and drawings are to be regarded in an illustrative rather than a restrictive sense.

What is claimed is:

1. A method, comprising:
    emitting radiation into an earth formation from a source positioned below a surface of the earth;
    collecting radiation that is a result of the emitted radiation interacting with a formation of the earth;
    determining a total carbon yield from the resulting radiation;
    adjusting the total carbon yield to provide an amount of organic carbon content in the formation, according to an amount of inorganic carbon content from one or more carbonate materials or one or more iron-carbon based materials in the formation; and
    calibrating the amount of organic carbon content to vitrinite reflectance associated with the formation.

2. The method of claim 1, further comprising:
    determining the amount of inorganic carbon content from the one or more carbonate minerals in the formation based on a carbon-calcium ratio derived from the resulting radiation.

3. The method of claim 1, further comprising:
    removing the amount of inorganic carbon content from the one or more carbonate minerals from the total carbon yield to generate an adjusted carbon yield.

4. The method of claim 1, further comprising:
    determining the amount of inorganic carbon content from the one or more iron-carbon based minerals in the formation based on a carbon-iron ratio derived from the resulting radiation.

5. The method of claim 4, further comprising:
    determining the carbon-iron ratio using an adjusted iron yield based on a total iron yield determined from the resulting radiation and an iron yield derived from a casing.

6. The method of claim 5, wherein the casing includes a variable iron content along its length.

7. The method of claim 6, further comprising:
determining an iron content of the casing positioned adjacent to a position of the source; and
removing any iron content of the casing from the total iron yield to generate the adjusted iron yield.

8. The method of claim 1, further comprising:
removing the amount of inorganic carbon content from the one or more iron-carbon based minerals from an adjusted carbon yield to generate the amount of organic carbon content in the formation, the adjusted carbon yield based on the amount of inorganic carbon content from the one or more carbonate materials.

9. The method of claim 1, further comprising:
determining that a borehole from which the radiation is emitted into the formation includes a casing having iron content.

10. The method of claim 9, further comprising:
determining a total iron yield from the resulting radiation; and
determining iron yield derived from the casing.

11. The method of claim 10, further comprising:
removing the iron yield derived from the casing from the total iron yield to generate an adjusted iron yield.

12. The method of claim 1, further comprising:
transmitting, as an output and provided by a processor, the amount of organic carbon content to a logging facility.

13. The method of claim 1, wherein the resulting radiation comprises:
scattering gamma ray spectra.

14. The method of claim 1, wherein the collecting further comprises:
collecting the resulting radiation as gamma rays; and
sorting the gamma rays by time and energy.

15. The method of claim 14, further comprising:
converting the gamma rays sorted by time to a capture cross section.

16. The method of claim 14, further comprising:
converting the gamma rays sorted by energy to element yield measurements.

17. An apparatus, comprising:
a radiation source to emit radiation into an earth formation when the radiation source is positioned below a surface of the earth;
a radiation detector to collect radiation that is a result of the emitted radiation interacting with a formation of the earth; and
a processor configured to (i) adjust a total carbon yield determined from the resulting radiation to provide an amount of organic carbon content in the formation, and (ii) to calibrate the amount of organic carbon content to vitrinite reflectance associated with the formation,
wherein the total carbon yield is adjusted according to an amount of inorganic carbon content from one or more carbonate materials or one or more iron-carbon based materials in the formation.

18. The apparatus of claim 17, wherein the radiation source comprises at least one of a pulsed neutron source or an accelerator neutron source.

19. The apparatus of claim 17, wherein the radiation detector comprises a gamma ray detector.

20. A system, comprising:
a radiation source to emit radiation into an earth formation when the radiation source is positioned below a surface of the earth;
a radiation detector to collect radiation that is a result of the emitted radiation interacting with a formation of the earth;
a processor configured to,
adjust a total carbon yield determined from the resulting radiation to provide an amount of organic carbon content in the formation, according to an amount of inorganic carbon content from one or more carbonate materials or one or more iron-carbon based materials in the formation, and
calibrate the amount of organic carbon content to vitrinite reflectance associated with the formation; and
a downhole tool attached to at least one of the radiation source or the radiation detector.

21. The system of claim 20, wherein the processor is attached to the downhole tool.

22. The system of claim 20, wherein the downhole tool comprises a logging while drilling tool or a wireline tool.

* * * * *

UNITED STATES PATENT AND TRADEMARK OFFICE
CERTIFICATE OF CORRECTION

PATENT NO.         : 8,618,472 B2
APPLICATION NO.    : 13/263305
DATED              : December 31, 2013
INVENTOR(S)        : Fnu Suparman Page 1 of 1

It is certified that error appears in the above-identified patent and that said Letters Patent is hereby corrected as shown below:

In the Claims

Column 10, line 26, in Claim 20, delete "to," and insert --to:--, therefor

Signed and Sealed this
Twenty-seventh Day of May, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,618,472 B2  Page 1 of 1
APPLICATION NO. : 13/263305
DATED : December 31, 2013
INVENTOR(S) : Fnu Suparman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 44 days.

Signed and Sealed this
Twenty-second Day of September, 2015

Michelle K. Lee
*Director of the United States Patent and Trademark Office*